(12) United States Patent
Bradley (10) Patent No.: US 6,996,158 B2
(45) Date of Patent: Feb. 7, 2006

(54) SIGNAL DETECTION USING A CDMA RECEIVER

(75) Inventor: Wayne H. Bradley, West Chicago, IL (US)

(73) Assignee: Freescale Semiconductors, Inc., Austin, TX (US)

( * ) Notice: Subject to any disclaimer, the term of this patent is extended or adjusted under 35 U.S.C. 154(b) by 722 days.

(21) Appl. No.: 09/791,950

(22) Filed: Feb. 22, 2001

(65) Prior Publication Data

US 2002/0141487 A1 Oct. 3, 2002

(51) Int. Cl.
H04B 1/69 (2006.01)
H04B 1/707 (2006.01)
H04B 1/713 (2006.01)

(52) U.S. Cl. ........................... 375/148; 375/150
(58) Field of Classification Search ............... 375/148, 375/368, 147, 149, 150; 370/514, 334
See application file for complete search history.

(56) References Cited

U.S. PATENT DOCUMENTS

| | | | | |
|---|---|---|---|---|
| 5,594,718 A * | 1/1997 | Weaver, Jr. et al. | ......... | 370/331 |
| 5,602,836 A | 2/1997 | Papadopoulos et al. | ..... | 370/280 |
| 5,640,686 A * | 6/1997 | Norimatsu | ................ | 455/74 |
| 5,649,308 A * | 7/1997 | Andrews | ................ | 370/334 |
| 5,724,385 A | 3/1998 | Levin et al. | ............... | 375/222 |
| 5,768,254 A | 6/1998 | Papadopoulos et al. | ..... | 370/201 |
| 5,867,537 A | 2/1999 | Dent | ..................... | 375/298 |
| 5,978,679 A | 11/1999 | Agre | ..................... | 455/442 |
| 6,049,577 A * | 4/2000 | Gothe et al. | ............ | 375/368 |
| 6,141,373 A | 10/2000 | Scott | ..................... | 375/150 |
| 6,154,486 A | 11/2000 | Scott et al. | ............... | 375/142 |
| 6,373,881 B1 * | 4/2002 | Mizuguchi et al. | ........ | 375/147 |
| 6,628,960 B1 * | 9/2003 | Tolson et al. | ............ | 370/319 |
| 6,690,949 B1 * | 2/2004 | Shamlou et al. | .......... | 455/557 |
| 6,697,438 B2 * | 2/2004 | Doetsch et al. | .......... | 375/316 |
| 2002/0111187 A1 * | 8/2002 | Harda et al. | ............. | 455/553 |
| 2002/0141516 A1 * | 10/2002 | Willenegger | ............ | 375/341 |
| 2003/0050085 A1 * | 3/2003 | Peluso et al. | ............ | 455/522 |
| 2003/0211862 A1 * | 11/2003 | Hutchison et al. | ........ | 455/552.1 |

FOREIGN PATENT DOCUMENTS

WO WO 00/51376 A1 * 8/2000

* cited by examiner

*Primary Examiner*—Stephen Chin
*Assistant Examiner*—Jia Lu
(74) *Attorney, Agent, or Firm*—G. Peter Albert, Jr.; Foley & Lardner, LLP (57) ABSTRACT

A code division multiple access (CDMA) receiver detects the presence of differently formatted signals (e.g., global system for mobile communications (GSM) signals) by programming a CDMA searcher co-processor, which includes a digital filter, with tap weights that correlate with a known sequence within the differently formatted signals. If the tap weights correlate to a received signal, the receiver produces an indication that a differently formatted signal is present. Once differently formatted signals are detected, specific hardware and/or software may be implemented to receive and process the differently formatted signals.

36 Claims, 8 Drawing Sheets

SIGNAL DETECTION USING A CDMA RECEIVER

TECHNICAL FIELD

The present invention is directed to communication systems and, more particularly, to the detection of communication signals using a code-division multiple access (CDMA) receiver.

BACKGROUND ART

Digital communication systems typically include a mobile unit, which may be embodied in an analog or digital cellular telephone or any other portable communication device, and an infrastructure unit, which may be embodied in a cellular base station or any other suitable communication hardware. During operation, the mobile unit and the infrastructure unit exchange digital information using one of a number of communication protocols. For example, the mobile and infrastructure units may exchange information according to a time division multiple access (TDMA) protocol, a code division multiple access (CDMA) protocol or a global system for mobile communications (GSM) protocol. The details of the TDMA protocol are disclosed in the IS-136 communication standard, which is available from the Telecommunication Industry Association (TIA). The GSM protocol is widely used in European countries and within the United States. The details of the GSM protocol are available from the European Telecommunications Standards Institute. The details of the second generation CDMA protocol are disclosed in the IS-95 communication standard. Third generation CDMA standards are typically referred to as WCDMA (Wideband CDMA). The most prevalent WCDMA standards that are currently being developed are the IS-2000 standard, which is an evolution of the IS-95 protocol, and the uniform mobile telecommunication system (UMTS) protocol, which is an evolution of the GSM protocol.

The presence of TDMA, CDMA and GSM protocol-based infrastructure disposed in various geographic regions throughout, for example, the United States may require a mobile telephone to process information according to any one of the TDMA, CDMA or GSM formats at any given time. For example, near major metropolitan areas a mobile unit may need to exchange information with CDMA base stations. Conversely, in other areas, GSM base stations may be prevalent and a mobile unit would need to exchange information according to the GSM format in such locations.

Because of the geographic differences in the types of infrastructure, some mobile units are able to process information according to any one of the TDMA, CDMA and GSM formats. For such processing to take place, mobile units must be able to detect the presence of signals formatted according to any one of these formats. It is known to power up various portions of different hardware to detect the presence of the variously formatted signals. For example, while communicating with a CDMA base station, a mobile unit may power up its GSM receiver hardware to determine if a GSM signal is present. However, as will be readily appreciated, powering up various portions of hardware merely to detect the presence of a signal is costly in terms of mobile unit battery life and processing demands.

SUMMARY OF THE PREFERRED EMBODIMENTS

According to one aspect, the present invention may be embodied in a method of using a code division multiple access (CDMA) receiver having a digital filter to detect the presence of a differently formatted communication signal, the differently formatted signal having a symbol rate and including a known sequence. In such an arrangement, the method may include programming the digital filter of the CDMA receiver with tap weights that correlate with the known sequence of the differently formatted signal, determining a correlation between received signals and the tap weights of the digital filter and indicating the presence of a differently formatted signal if the correlation satisfies a threshold.

According to a second aspect, the invention may be embodied in a code division multiple access (CDMA) receiver that detects the presence of a differently formatted signal within received signals, the differently formatted signal having a symbol rate and including a known sequence. In such an arrangement, the CDMA receiver may include a digital filter having a plurality of taps each having a programmable tap weight, the digital filter adapted to correlate the received signal with the programmable tap weights and a controller that programs the digital filter with tap weights that correlate with the known sequence of the differently formatted signal and that indicates the presence of a differently formatted signal if the correlation performed by the digital filter satisfies a threshold.

According to a third aspect, the invention may be embodied in a code division multiple access (CDMA) receiver that detects the presence of a differently formatted signal within received signals, the differently formatted signal having a symbol rate and including a known sequence. The CDMA receiver may include a memory, a first set of instructions stored on the memory and adapted to cause the processor to program the digital filter of the CDMA receiver with tap weights that correlate with the known sequence of the differently formatted signal and a second set of instructions stored on the memory and adapted to cause the processor to determine a correlation between received signals and the tap weights of the digital filter. Further, the CDMA receiver may include a third set of instructions stored on the memory and adapted to cause the processor to indicate the presence of a differently formatted signal if the correlation satisfies a threshold.

According to a fourth aspect, the invention may be embodied in a code division multiple access (CDMA) receiver that detects the presence of a differently formatted signal within received signals, the differently formatted signal having a symbol rate and including a known sequence. The CDMA receiver may include an analog to digital converter that samples the received signals at a CDMA chip rate and a co-processor including a digital filter having a plurality of taps each having a programmable tap weight. The co-processor may be adapted to correlate the sampled received signal with the programmable tap weights. The CDMA receiver may also include a processor that programs the co-processor with tap weights that correlate with the known sequence of the differently formatted signal, receives the correlation from the co-processor and indicates the presence of a differently formatted signal if the correlation performed by the co-processor satisfies a threshold.

These and other features of the present invention will be apparent to those of ordinary skill in the art in view of the description of the preferred embodiments, which is made with reference to the drawings, a brief description of which is provided below.

DESCRIPTION OF THE PREFERRED EMBODIMENTS

As described hereinafter, a CDMA receiver is capable of detecting the presence of differently formatted communication signals by programming a CDMA searcher co-processor with appropriate weights, thereby eliminating the necessity to power receiver hardware or to execute software instructions that are specific to the particular format of the communication signals. As used herein differently formatted signals include any signals that are not formatted according to a CDMA format. For example, GSM or other signals having known portions therein may be considered to be differently formatted signals. While the following description provides the details of detecting a GSM signal, a GSM signal is merely exemplary of one type of differently formatted signal.

One example that is described in detail below is the use of a CDMA receiver to detect the presence of GSM signals. Although the detection of GSM signals using a CDMA receiver is described, it should be readily understood that such an example is merely illustrative. As part of detecting the presence of GSM signals, signals from the CDMA searcher may be processed to ensure such signals have acceptable correlation properties. Once GSM signals are detected, GSM-specific hardware and/or software may be implemented to receive and process the GSM signals in a known manner.

Figure 1A:
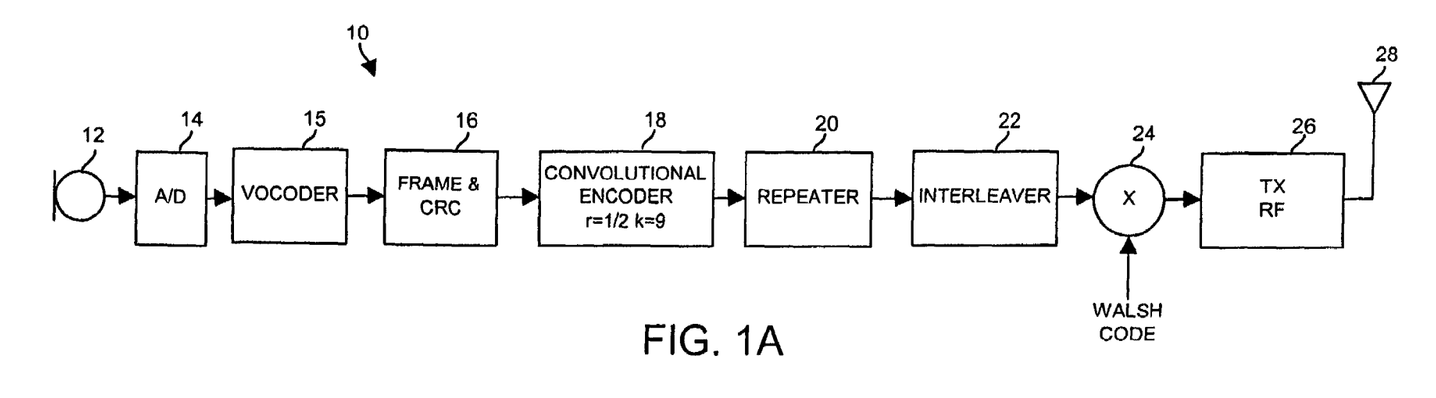
FIG. 1A is an exemplary block diagram of a transmit lineup of a code-division multiple access (CDMA) communication system.

Turning now to FIG. 1A, a transmit lineup 10, such as a lineup that may be used in a cellular base station of a CDMA system operating in accordance with the IS-95 standard, may include a microphone 12 coupled to an analog to digital converter (A/D) 14, a voice coder (vocoder) 15, a frame and cyclic redundancy check (CRC) module 16 and an encoder 18. The transmit lineup 10 may further include a repeater 20 coupled to an interleaver 22, the output of which is coupled to a multiplier 24 that multiplies the output of the interleaver 22 by a Walsh code. The output of the multiplier 24 may be coupled to transmitter radio frequency (RF) circuitry 26, which is further coupled to an antenna 28.

In operation, the microphone 12 and the A/D 14 cooperate to produce a bitstream representative of voice that is received at the microphone 12. As will be appreciated by those having ordinary skill in the art, the microphone 12 may be replaced with a conventional telephone line carrying analog information or may be replaced with any other analog information source. In such a case, the analog information would be sampled, or quantized by the A/D 14 to produce a bitstream. If the A/D 14 samples a signal representative of voice, the output bitstream of the A/D 14 may be coupled to the vocoder 15, which, in any known manner, encodes the bitstream representative of voice for transmission through a communication channel. Alternatively, as will also be appreciated by those having ordinary skill in the art, the microphone 12, the A/D 14 and, optionally, the vocoder 15 could be eliminated in favor of a data source that outputs a digital bitstream that does not need to be sampled to create a bitstream. Such a data source could be coupled to the vocoder 15 or could be coupled directly to the frame and CRC module 16.

The bitstream, whether it is produced by the A/D 14 and the vocoder 15 or is provided by some other data source (not shown), may be coupled to the frame and CRC module 16, which processes the bitstream in a known manner. As will be appreciated by those having ordinary skill in the art, the output of the frame and CRC module 16 may be a bitstream that is partitioned into frames that may be, for example, 20 milliseconds (ms) in length and have 384 bits therein. Additionally, the bitstream from the frame and CRC module 16 may have cyclic redundancy information, or any other suitable error detecting and correcting information, appended thereto. The output bitstream from the frame and CRC module 16 may have bit rates of, for example, 1.2, 2.4, 4.8 or 9.6 kilobits per second (kbps). Alternatively, as will be appreciated by those having ordinary skill in the art, the bitstream produced by the frame and CRC module 16 may have any other suitable bit rate and the foregoing enumerated bit rates are, therefore, to be construed as exemplary and not as limiting. The bitstream bit rate from the frame and CRC module 16 may change on a frame-by-frame basis depending on various conditions within the communication system such as, for example, noise, noise interference, multipath interference and the like.

The bitstream produced by the frame and CRC module 16 may be coupled to the encoder 18, which converts the bitstream into a symbol stream. The encoder 18 may be, for example, a rate ½ convolutional encoder or may be any other suitable encoder using any suitable coding scheme. As will be appreciated by those having ordinary skill in the art, the encoder 18 may multiply the bitstream from the frame and CRC module 16 by various polynomials to encode the bitstream into a symbol stream. For example, each bit of the bitstream may be multiplied by polynomials g1 and g2, which may be, for example, $1+D^2$ and $1+D+D^2$, respectively, wherein "D" represents a one bit delay and "$D^2$" represents a two bit delay. The results of each bit being multiplied by each polynomial are combined together so that the odd bits of the bitstream from the frame and CRC module 16 were multiplied by g1 and the even bits of the bitstream were multiplied by g2. As the encoder 18 encodes the bitstream from the frame and CRC module 16, the encoder 18 produces a symbol stream. If the encoder 18 is a rate ½ encoder, the symbol stream will have a symbol rate that is twice the bit rate of the bitstream that was provided to the encoder 18. For example, considering a rate ½ encoder, input bitstreams having bit rates of 1.2, 2.4, 4.8 and 9.6 kbps correspond to symbol streams having symbol rates of 2.4, 4.8, 9.6 and 19.2 kilosymbols per second (ksps), respectively.

The symbol stream from the encoder 18 may be coupled to the repeater 20, which, regardless of the symbol rate of the symbol stream produced by the encoder 18, produces an output having a symbol rate of 19.2 ksps by, if necessary, repeating various ones of the symbols produced by the encoder 18. For example, if the bitstream from the frame and CRC module 16 had a bit rate of 1.2 kbps and the encoder processed the bitstream to produce a symbol stream having a symbol rate of 2.4 ksps, the repeater 20 will repeat each symbol in the symbol stream eight times to convert the 2.4 ksps symbol stream into a 19.2 ksps symbol stream. Alternatively, by way of further example, if the bitstream from the frame and CRC module 16 has a bit rate of 9.6 kbps and encoder 18 processes the bitstream to produce a symbol stream having a symbol rate of 19.2 ksps, the repeater 20 will not repeat any of the symbols in the symbol stream because the symbol rate of the symbol stream is already 19.2 ksps.

The output of the repeater 20, which may be referred to as a repeated and encoded symbol stream, is coupled to the interleaver 22 which, in a known manner, interleaves various temporal portions of the symbol stream to protect against burst errors in the communication channel. After the symbol stream has been interleaved, it is coupled to the multiplier 24, which multiplies the symbol stream by the Walsh code. The Walsh code, as will be appreciated by one having ordinary skill in the art, may be a 64-symbol code designed to be mutually orthogonal with other Walsh codes. Accordingly, the mutually orthogonal Walsh codes enable various CDMA transmitters and receivers to occupy the same geographical space and frequency bandwidth without significantly interfering with one another. In addition to being multiplied by the Walsh code, the symbol stream from the interleaver 22 may also be multiplied by various other short and long codes, which are well known to those having ordinary skill in the art. Of course, as will be readily appreciated by those having ordinary skill in the art, other signals besides Walsh codes could be multiplied with the output of the interleaver 22.

The output of the multiplier 24, which may have various other data bits or symbols used for power control multiplexed therewith, is coupled to the transmitter RF circuitry 26. According to conventionally known techniques, the transmitter RF circuitry 26 modulates a carrier signal based on the output of the multiplier 24 and performs upconversion to convert the output of the multiplier 24 to an RF signal appropriate for transmission by the antenna 28. For example, the transmitter RF circuitry 26 may modulate an RF carrier using, for example, quadrature phase shift keying (QPSK), differential quadrature phase shift keying (DQPSK), binary phase shift keying (BPSK), quadrature amplitude modulation (QAM), Gaussian minimum shift keying (GMSK) or any other suitable modulation technique. Additionally, the modulated carrier signal may be upconverted to a signal having a frequency in the ranges of, for example, 450, 800, 900, 1800, 1900 megahertz (MHz) or any other suitable frequency range.

While the foregoing describes certain aspects of the transmit lineup 10 of a CDMA system, further detail regarding such a system may be found in the IS-95 specification, which is incorporated herein by reference and is available from the TIA.

An alternative cellular technology, which, like a CDMA system, is arranged into base stations and mobile units, is the GSM system, a specification of which is available from the European Telecommunications Standards Institute. As will be readily appreciated by those that are familiar with GSM systems, GSM systems transfer data between base stations and mobile units using ten bits of resolution and a 270.8333 kilohertz (kHz) symbol rate that may be implemented using GMSK modulation. GSM systems broadcast information in bursts, such as frequency bursts, synchronization bursts and normal bursts. Each of the frequency and synchronization bursts, which are typically broadcast by the base stations to all mobile units, include known bit sequences or codes that are recognizable by any GSM mobile unit. In particular, the frequency and synchronization bursts use known codes that are 26 and 64 bits in length, respectively. In contrast to the frequency and synchronization bursts, a base station uses a normal burst to communicate with a particular mobile unit. Accordingly, normal bursts include codes that are specific to the particular mobile unit with which the base station is communicating.

Figure 1B:
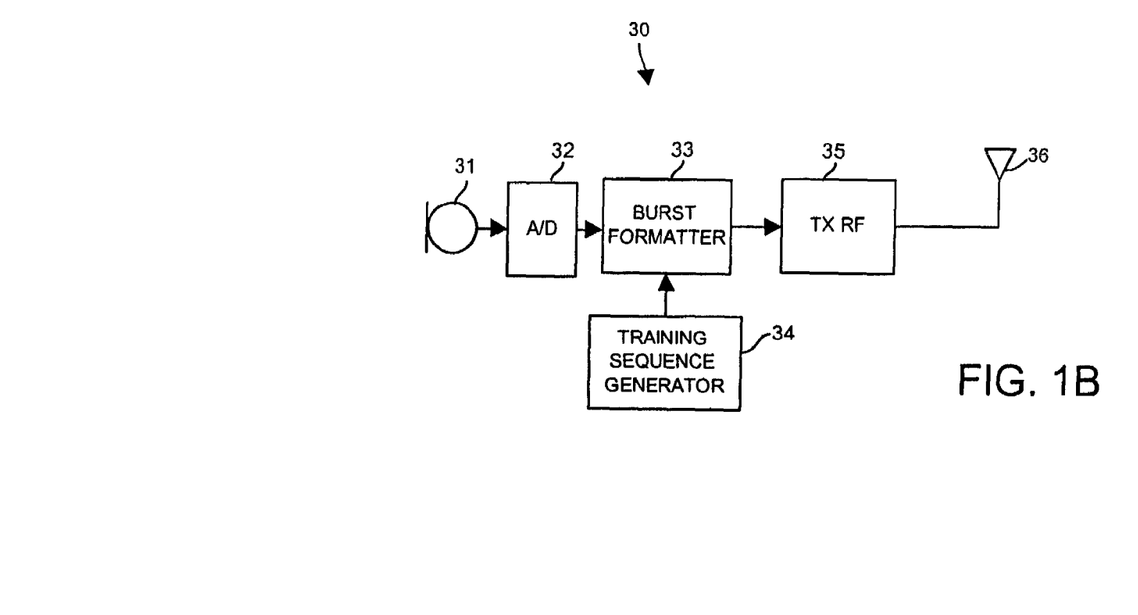
FIG. 1B is an exemplary block diagram of a transmit lineup of a GSM communication system.

Similar to the transmit lineup 10 shown in FIG. 1A, a GSM transmit lineup 30 shown in FIG. 1B may include a microphone 31 and an A/D 32. However, as will be readily appreciated, the microphone 31 and the A/D 32 need not be identical to the microphone 12 and the A/D 14 of the transmit lineup 10. For example, the A/D 32 may have 10 bits of resolution to be compatible with the GSM protocol, whereas the A/D 14 of FIG. 1A may have 6 bits of resolution to be compatible with the CDMA protocol. Additionally, the microphone 31 may be replaced with any suitable analog signal source that would be sampled by the A/D 32. Alternatively, the microphone 31 and the A/D 32 may be replaced by a digital signal source.

The output of the A/D 32, which is the data that is to be transmitted, is coupled to a burst formatter 33, which also receives an input from a training sequence generator 34. The training sequence generator 34 stores the 26 and 64 bit known sequences or codes that all GSM mobile units recognize. The burst formatter 33 processes the data produced by the A/D 32 and the codes provided by the training sequence generator 34 to produce frequency, synchronization and normal bursts. The bursts produced by the burst formatter 33 are coupled to RF transmission circuitry, which is represented by a block 35 in FIG. 1B. The TX RF 35 may modulate, amplify and upconvert the information from the burst formatter 33 to a frequency and amplitude suitable for transmission by an antenna 36. For example, the TX RF 35 may modulate a carrier wave using GMSK, or any other suitable modulation that may or may not have a constant envelope, to encode the carrier wave with information provided by the burst formatter 33.

Figure 2A:
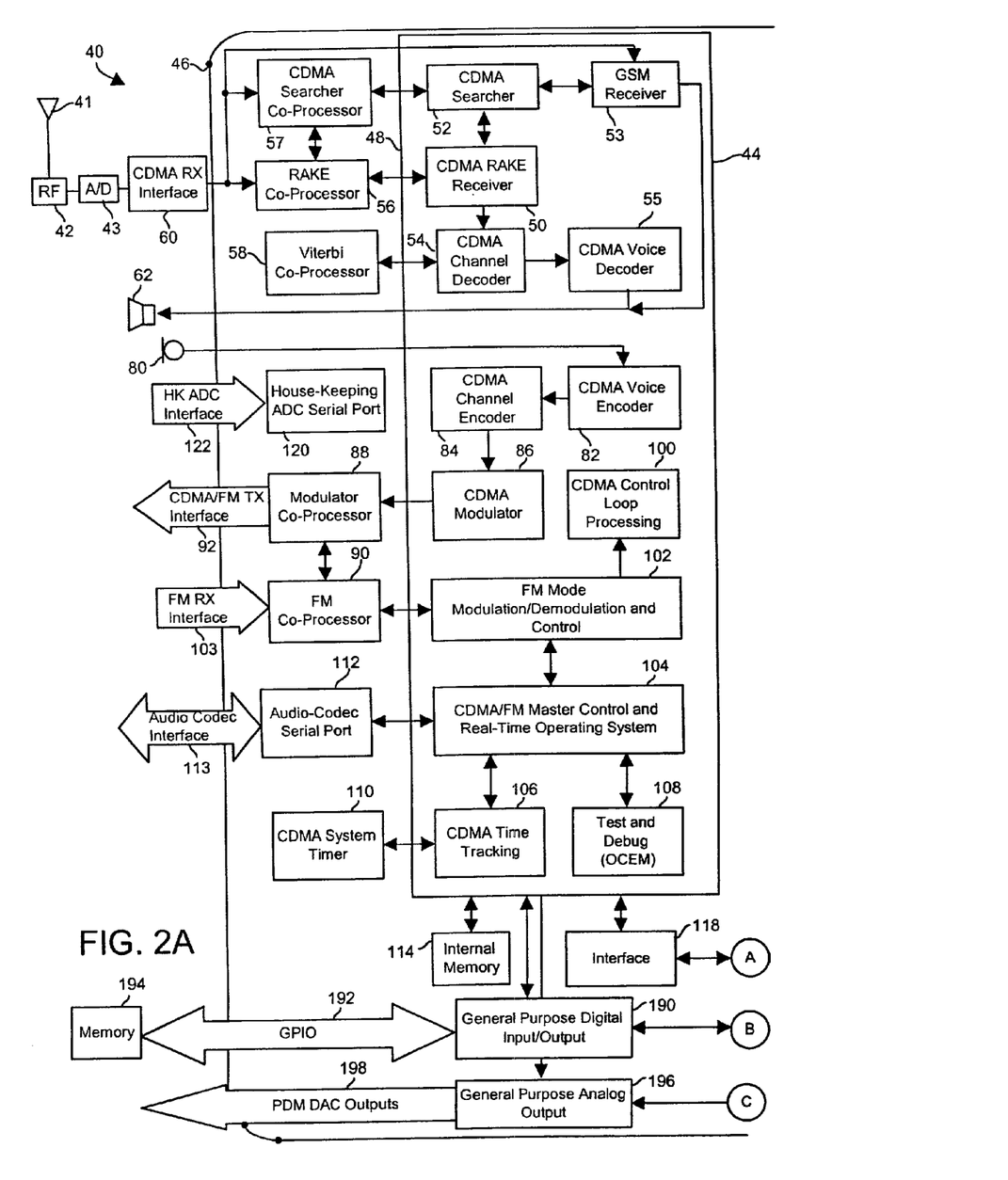
FIGS. 2A and 2B taken together form an exemplary block diagram of a mobile communication system.
Figure 2B:
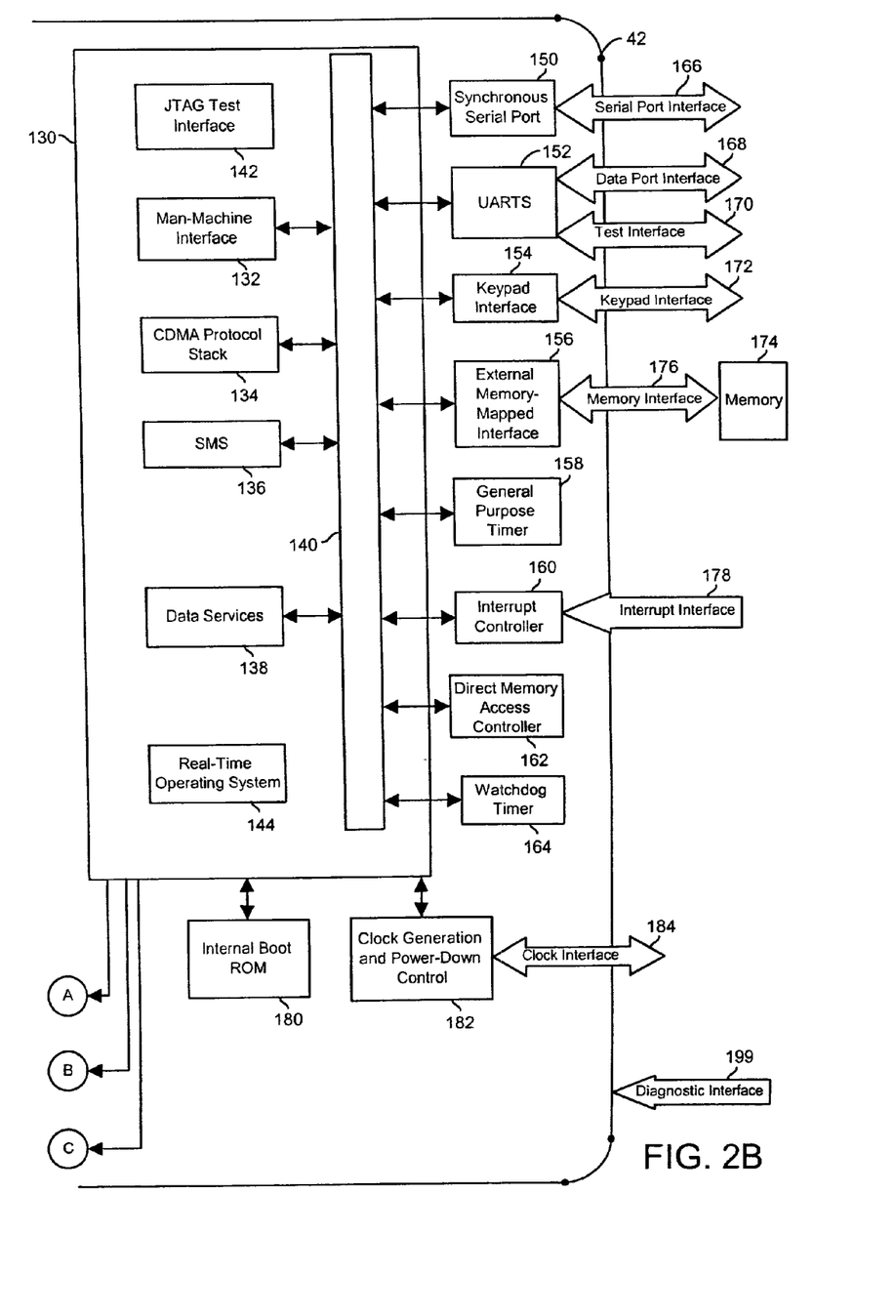

As shown in FIGS. 2A and 2B, a mobile communication system 40 may include an antenna 41 coupled to an RF front end 42, the output of which is coupled to an A/D 43. The mobile communication system 40 may also include a transceiver integrated circuit (IC) 46 and various other components external to the transceiver IC 46. Such a communication system may be used in a digital cellular telephone or in any other device that is adapted to receive digital communications that operate on a CDMA system. In particular, as shown in FIG. 2A, the transceiver IC 46 may include a digital signal processor (DSP) portion 48 that performs various voice and data processing functions. The DSP portion 48 includes a CDMA RAKE receiver 50, a CDMA searcher 52, a GSM receiver 53, a CDMA channel decoder 54 and a CDMA voice decoder 55, all of which collectively form a receive path for converting information received at the antenna 41 into audio information.

External to the DSP portion 48, the receive path may further include a RAKE co-processor 56 interfaced to the CDMA RAKE receiver 50 and a CDMA searcher co-processor 57 coupled to the CDMA searcher 52. Additionally, the transceiver IC 46 may include a Viterbi co-processor 58 interfaced to the CDMA channel decoder 54.

During operation of the mobile communication system 40 and reception of CDMA signals, signals from the A/D 43 may be coupled to the RAKE co-processor 56 and the CDMA searcher co-processor 57, via a CDMA RX interface 60. The CDMA searcher co-processor 57, which is controlled by the CDMA searcher 52 of the DSP portion 48, processes information from the CDMA RX interface 60 to produce a channel estimate that is coupled to the RAKE co-processor 56 and the CDMA searcher 52. In a known manner, the RAKE co-processor 56 processes information from the front end and the CDMA searcher co-processor 57 by, for example, correlating such information against a known pseudorandom sequence and integrating and dumping the results of the integration. The results of the processing carried out by the RAKE co-processor 56 are coupled to the CDMA RAKE receiver 50. The CDMA searcher 52, which may be coupled to the CDMA RAKE receiver 50, time aligns a pseudorandom sequence generator of the transceiver IC 46 with the pseudorandom sequence received from the transmit lineup 10.

The CDMA RAKE receiver 50 processes the output from the RAKE co-processor 56 to generate soft weighted symbols. The CDMA RAKE receiver 50 may perform such a function through the use of maximal ratio combining techniques. The soft weighted symbols may be coupled from the CDMA RAKE receiver 50 to the CDMA channel decoder 54. The CDMA channel decoder 54 cooperates with the Viterbi co-processor 58 to determine the maximum likelihood word that was transmitted by the transmit lineup 10 and couples the maximum likelihood word to the CDMA voice decoder 55, which appropriately decodes the maximum likelihood word into audio that may be coupled to a speaker 62. Accordingly, the receive lineup from the antenna 41 through the speaker 62 forms a path along which CDMA signals are received and converted into audio to be presented to the user of the mobile communication system 40.

To accommodate the reception of GSM signals, the output from the A/D 43 is also coupled to the GSM receiver 53, which processes GSM signals in a known manner. Of particular interest in FIG. 2A are the CDMA searcher co-processor 57, the CDMA searcher 52 and the GSM receiver 53. In general, the CDMA searcher co-processor 57 and the CDMA searcher 52 cooperate to detect the presence of GSM signals while the transceiver IC 46 is receiving CDMA signals. In particular, as will be described in detail hereinafter with respect to FIGS. 3–7, the CDMA searcher 52 programs the CDMA searcher co-processor 57 with tap weights that correlate with a known sequence, or portion thereof, of the GSM signal. The correlation of the received signal and the tap weights is coupled from the CDMA searcher co-processor 57 to the CDMA searcher 52, which compares the correlation to a threshold. If the threshold is satisfied, the transceiver IC 46 concludes that a GSM signal must be present and the CDMA searcher 52 may then enable the GSM receiver 53 so that signals from the AID 43 may be converted into audio signals that are coupled from the GSM receiver 53 to the speaker 62. Additionally, information indicating the timing of the peak correlation may be coupled from the CDMA searcher 52 to the GSM receiver 53.

Conversely, if the correlation produced by the CDMA searcher co-processor 57 is not above the threshold, the transceiver IC 46 does not presume that a GSM signal is present and, therefore, the CDMA searcher 52 reprograms the tap weights of the CDMA searcher co-processor 57 for reception of CDMA signals. Accordingly, the transceiver IC 46 may detect the presence of GSM signals without needing to power to GSM receiver 53 and incurring its attendant current and processing drain.

The transceiver IC 46 and, in particular, the DSP portion 48 also includes a transmit path that enables a user of the mobile communication system 40 to transmit audio to a receive lineup (not shown), which may be embodied in a cellular infrastructure cell site or the like. In particular, a user may speak into a microphone 80 that converts the voice of the user into an electrical signal, which is coupled to a CDMA voice encoder 82. The encoded voice signal is coupled from the CDMA voice encoder 82 to a CDMA channel encoder 84, which further encodes the encoded voice signal for transmission through a communication channel from the mobile communication system 40 to a receive lineup (not shown). The output of the CDMA channel encoder 84 is coupled to a CDMA modulator 86, which interacts with a modulator co-processor 88 and an FM co-processor 90 to appropriately modulate the channel encoded signal from the CDMA channel encoder 84 for broadcast over the communication channel. The output of the modulator co-processor 88 is coupled to a transmitter front end (not shown), via a CDMA/FM TX interface 92. The CDMA modulator 86 may modulate the signal from the CDMA channel encoder 84 using any known technique such as quadrature phase shift keying (QPSK) or any other suitable modulation scheme that may be used in connection with a CDMA communication system operating in compliance with the IS-95 standard.

As further shown in FIG. 2A, the DSP portion 48 may include a CDMA control loop processing function 100 that may automatically adjust gain, frequency and direct current (DC) offset of signals received by the transceiver IC 42. The CDMA control loop processing function 100 may be interfaced to an FM mode modulation/demodulation and control function 102, which is further interfaced to the FM co-processor 90 that may receive input from an FM RX interface 103. The block 102 may be further coupled to a CDMA/FM master control and real time operating system 104, which may be further interfaced to a CDMA time tracking function 106 and a test and debug function 108. In addition to being coupled to the block 104, the CDMA time tracking function 106 is further coupled to a CDMA system timer 110, which tracks sample times, symbol times and frame boundaries of information received from the transmit lineup 10. An audio-codec serial port 112 may be provided to couple data from outside the transceiver IC 42 into the block 104, via an audio codec interface 113. The transceiver IC 42 may also include an internal memory 114 coupled to the DSP portion 44, which may also be coupled to an interface 118. Further, the transceiver IC 42 may also include a house-keeping analog to digital controller serial port 120 that receives information from various analog inputs to, for example, adjust lookup tables used by the mobile communication system 40 to optimize the operation of the mobile communication system 40 by, for example, monitoring temperature.

As shown in FIG. 2B, the transceiver IC 46 includes a microcontroller portion 130. The microcontroller portion 130 includes a man machine interface 132, a CDMA protocol stack 134 an SMS 136 and data services 138, each of which may be interfaced to a bus 140. The microcontroller portion 130 also includes a JTAG test interface 142 and a real time operating system 144. Various functions within the transceiver IC 42 may also be interfaced to the bus 140 disposed within the microcontroller portion 130. For example, a synchronous serial port 150, UARTS 152, a keypad interface 154, an external memory map interface 156, a general purpose timer 158, an interrupt controller 160, a direct memory access controller 162 and a watchdog timer 164 may be coupled to the bus 140 of the microcontroller portion 130.

The blocks 150, 152, 154, 156, 158, 160, 162, and 164 may also be interfaced with additional circuitry or data sources that are external to the transceiver IC 42. For example, the synchronous serial port 150 may be communicatively coupled to the external circuitry of the receiver system 40 via a serial port interface 166 and the UARTS 152 may be coupled to a data port interface 168 and a test interface 170. To provide a user interface, the keypad interface 154 is communicatively coupled to a keypad (not shown) via a keypad interface 172. The mobile communication system 40 may also include additional external memory 174 coupled to the external memory mapped interface 156 via a memory interface 176. Additionally, external interrupts may be generated by the receiver system 40 and may be coupled to the bus 140, via the interrupt controller 160 and an interrupt interface 178. The microcontroller portion 130 may also be interfaced to an internal boot ROM 180 and to a clock generation and power down control 182, which receives a clock signal external to the transceiver IC 42 via the clock interface 184.

The microcontroller portion 130 may also be coupled to the interface 118, which enables the DSP portion 44 and the microcontroller portion 130 to exchange information. A general purpose digital input/output block 190 is interfaced to both of the DSP portion 44 and the microcontroller portion 130 of the transceiver IC 42 to enable data to be coupled into and out of the transceiver IC 42 via a general purpose I/O (GPIO) bus 192. For example, an external memory 194 may be coupled to the general purpose digital input/output 180 via the GPIO bus 192. A general purpose analog output 196 receives output signals from both the DSP portion 44 and the microcontroller portion 130 of the transceiver IC 42 and couples such signals out of the transceiver IC 42 via PDM DAC outputs 198. In general, the transceiver IC 42 may also include a diagnostic interface 199 to which other components of the mobile communication system 40 may be interfaced.

Figure 3:
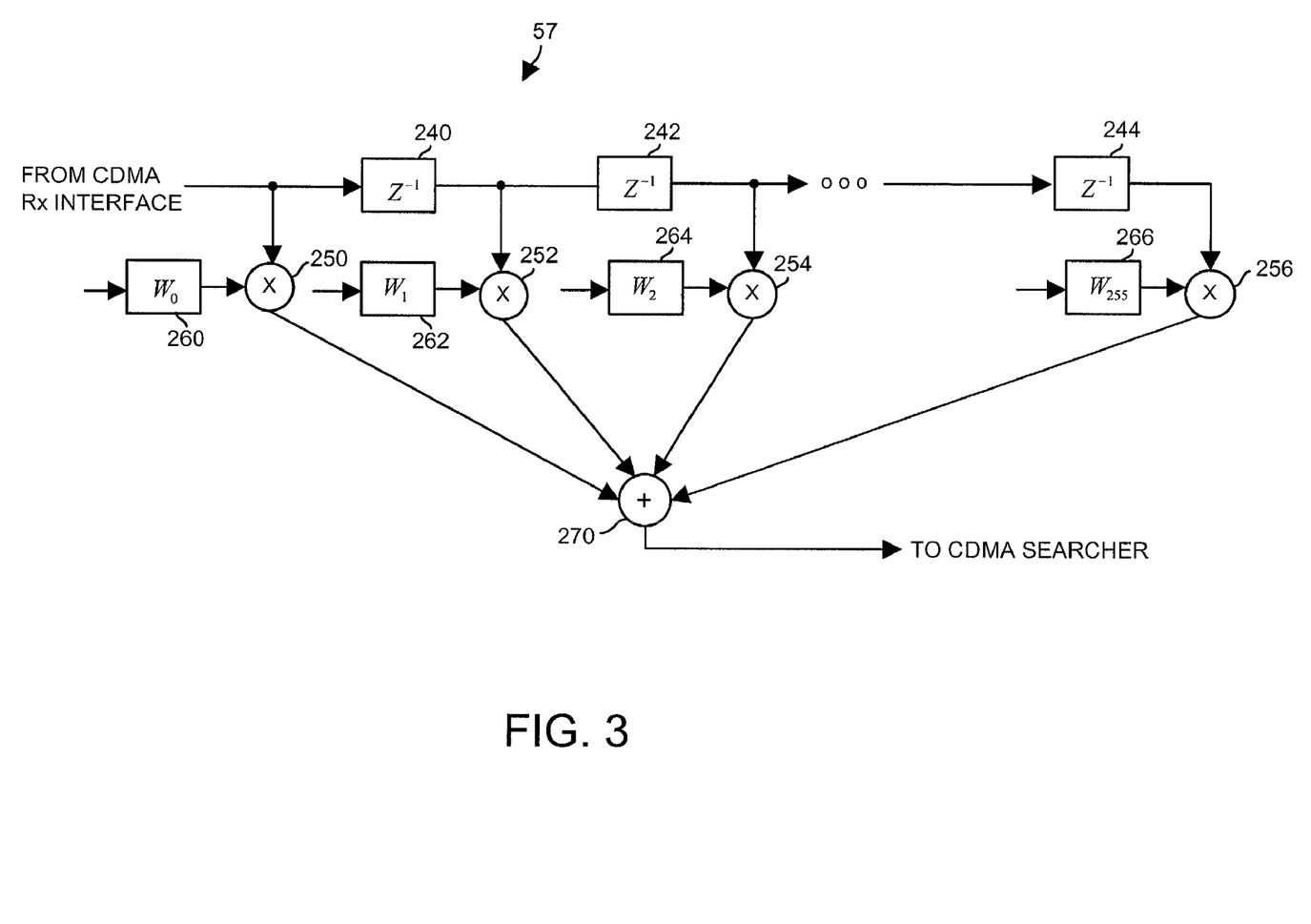
FIG. 3 is an exemplary block diagram of the CDMA searcher co-processor of FIG. 2A.

As shown in further detail in FIG. 3, the CDMA searcher co-processor 57 may include a number of delay block, three of which are shown at reference numerals 240, 242, and 244, the inputs and output of which are coupled to a number of multipliers, four of which are shown at reference numerals 250, 252, 254, and 256. The CDMA searcher co-processor 57 may also include a number of programmable tap weights, shown at reference numerals 260, 262, 264, and 266, which are also coupled to the multipliers 250, 252, 254, and 256. The outputs of the multipliers 250, 252, 254, and 256 are each coupled to an adder 270, which adds the output of the multipliers 250, 252, 254, and 256 together and couples the result to the CDMA search 52. As shown in FIG. 3, the CDMA search co-processor 57 may include 256 multipliers and 256 programmable tap weights. However, as will be readily appreciated by those having ordinary skill in the art, the CDMA searcher co-processor 57 may include any other suitable number of taps, weights and multipliers.

During operation of the CDMA searcher co-processor 57, samples or chips, which are received signals produced by the A/D 43, are coupled into and clocked through the cascaded arrangement of delay blocks 240–244 in the CDMA searcher co-processor 57 at the CDMA chip rate, which may be, for example 3.84 MHz. As the chips are clocked through the delay blocks 240–244, the chips are multiplied by the programmable tap weights $W_0$–$W_{255}$ shown in blocks 260–266, the values of which are controlled by the CDMA searcher 52, to produce a measurement of the correlation between the received chips and the programmable tap weights $W_0$–$W_{255}$.

While the transceiver IC 46 is receiving CDMA signals, the programmable tap weights $W_0$–$W_{255}$ are selected so that a known portion of a CDMA signal (e.g., a pseudorandom number) will produce a high correlation or channel metric when the CDMA signal is time aligned with the tap weights $W_0$–$W_{255}$. Accordingly, the CDMA searcher 52 can determine when the received signal is time aligned by monitoring the output of the adder 270 and looking for a peak correlation.

While the foregoing has described the operation of the CDMA searcher co-processor 57 for the reception of CDMA signals, the CDMA searcher co-processor 57 may also be used in conjunction with the CDMA searcher 52 to detect the presence of a GSM signal. In particular, as described below in conjunction with FIGS. 4 and 5, the CDMA searcher 52 may set the programmable weights $W_0$–$W_{255}$ so that a received signal having a known GSM sequence therein will yield a relatively large sum or channel metric at the output of the adder 270.

Because the CDMA chip rate is 3.84 MHz, because the GSM symbol rate is 270 KHz and the CDMA searcher co-processor 57 has 256 taps that are clocked at the CDMA chip rate, the CDMA searcher co-processor 57 can only correlate the received signal and the taps over roughly 14 symbols of a GSM signal. Because GSM signals have known portions that are either 26 or 64 symbols in length, a correlation over 14 bits is a subset of the known portion, but such a correlation is sufficient for detection of the presence of a GSM signal. Generally, it would be desirable to correlate over 14 symbols of the GSM signal having the best autocorrelation property. Typically, such symbols are the center 14 symbols of the known portion of the GSM signal.

Figure 4:
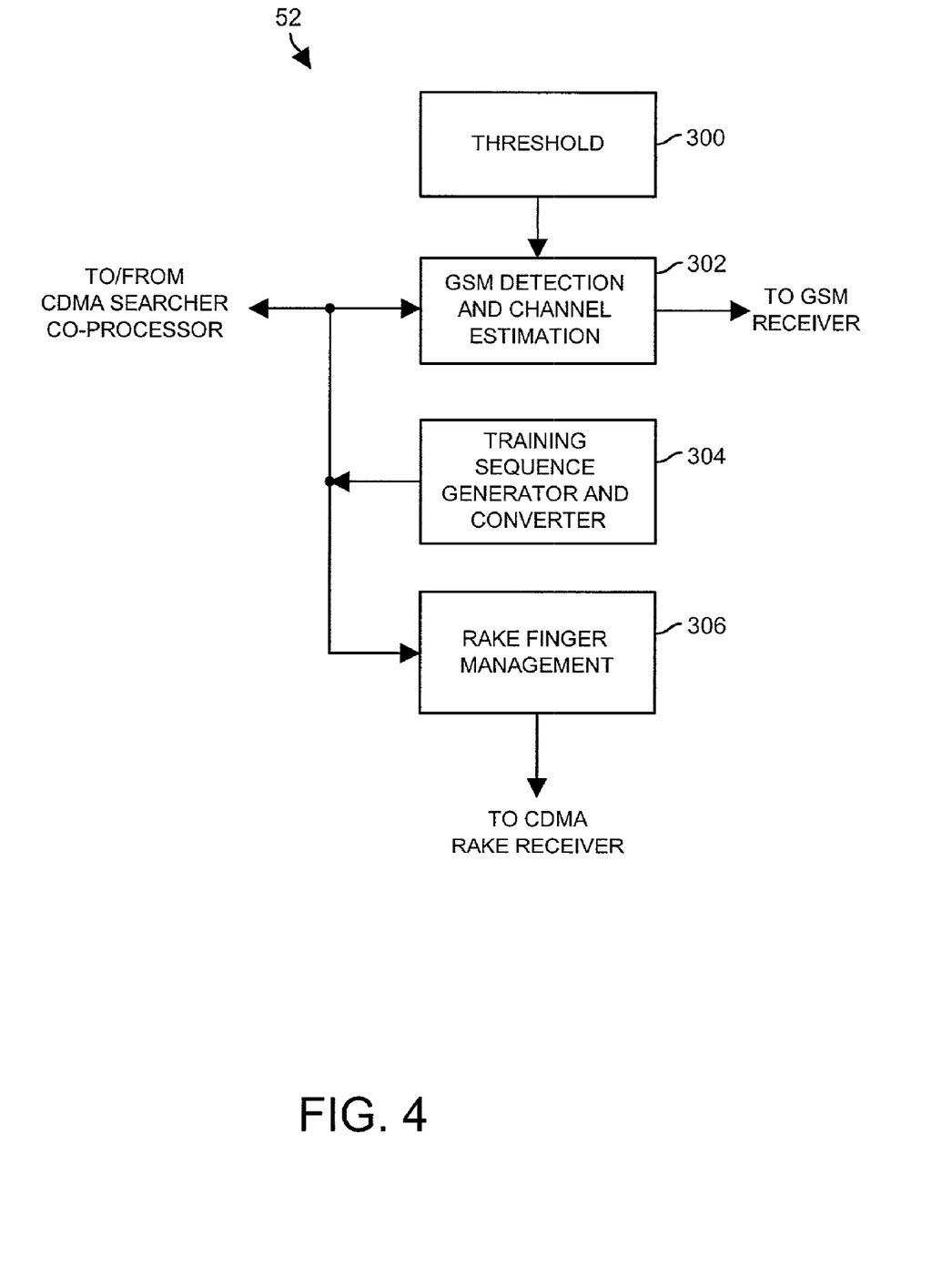
FIG. 4 is an exemplary block diagram of the CDMA searcher of FIG. 2A.

As shown in FIG. 4, the CDMA searcher 52 may include a threshold function 300, a GSM detection and channel estimation function 302, a training sequence generator and converter 304 and a RAKE finger management function 306. As will be readily appreciated by those having ordinary skill in the art, the foregoing functions may be implemented in hardware, in software or in any suitable combination of hardware or software. Each of the GSM detection and channel estimation function 302, the training sequence generator and converter 304 and the RAKE finger management function 306 is coupled to the CDMA searcher co-processor 57.

In general, during operation, GSM detection and channel estimation function 302, which is described in detail below with respect to FIG. 5, receives channel estimates or correlations from the adder 270 of the CDMA search co-processor 57 and compares those channel estimates or correlations to the threshold 300 to detect the presence of a GSM signal. The threshold may be set empirically based on a fixed level above a noise floor that is commonly produced by the adder 270 of FIG. 3 when there is no correlation between the received signal and the programmable tap weights 260, 262, 264, and 266. Alternatively, the threshold may be se to a fixed value relative to the scale of the analog to digital converter. If the block 302 determines that the signal from the adder 270 satisfies the threshold 300, the block 302 informs the GSM receiver 53 as such, so that the GSM receiver 53 may be powered up and used to receive the GSM signal. Additionally, the block 302 may provide synchronization or correlation timing information to the GSM receiver to indicate the time at which the threshold 300 was satisfied by the output of the adder 270.

The training sequence generator and converter 304, which is described below in detail in conjunction with FIG. 6, produces tap weights that are written into the programmable tap weights $W_0$–$W_{255}$ of FIG. 3. By changing the programmable tap weights $W_0$–$W_{255}$ that the transceiver IC 46 can receive CDMA signals as well as detect the presence of GSM signals.

The RAKE finger management function 306, which receives the channel estimate from the adder 270 of FIG. 3, determines the strongest set of multipath signals and coordinates the programming of the corresponding spreading sequences in rake fingers.

Figure 5:
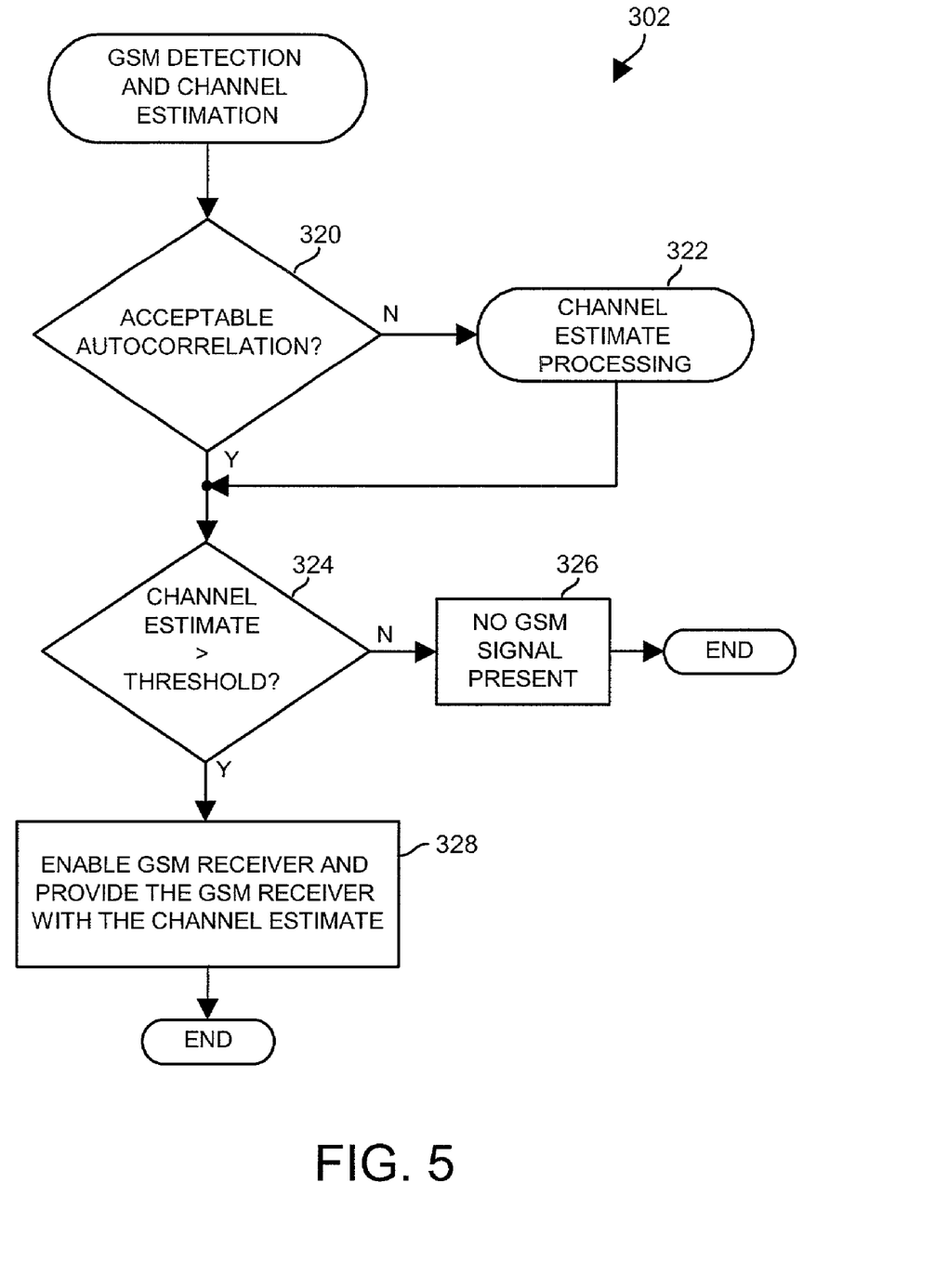
FIG. 5 is an exemplary flow diagram of an embodiment of the GSM detection and channel estimation function of FIG. 4.

As shown in FIG. 5, the GSM detection and channel estimation function 302 of FIG. 4 may be described by a flow diagram including a number of blocks. It should be understood that functions described herein using flow diagrams of block diagrams may be implemented by software instructions that are stored in a memory and executed by a processor or may be implemented by specially programmed hardware. Either way, the functionality described in connection with the flow and block diagrams should not be construed to be limited to particular hardware, software or hardware/software implementations.

The function 302 begins execution at a block 320 at which the process 302 determines if the autocorrelation of the correlation produced by the adder 270 of FIG. 3 is acceptable. The block 320 determines if the off peak correlations are sufficiently small in magnitude that a discernable peak in the adder 270 output is detectable. Acceptability of an autocorrelation may be determined by computing the power and comparing that value to a predetermined threshold.

If the block 320 determines that the autocorrelation of the correlation produced by the adder 270 is not acceptable, control passes from the block 320 to the block 322, which represents a channel estimate processing function. In a manner more fully described in connection with FIG. 6, the block 322 processes the channel estimate or correlation produced by the adder 270 to minimize off peak autocorrelations.

After the block 322 has completed, or if the block 320 determines that the autocorrelation of the signal from the adder 270 is acceptable, control passes to a block 324. The block 324 determines if the channel estimate produced by the adder 270 satisfies a threshold. The selection of an appropriate threshold was disclosed above with respect to block 300. If the channel estimate satisfies the threshold, control passes from the block 324 to a block 326, which indicates that no GSM signal is present. After the block 326 completes execution, the process 302 suspends until it is called upon to execute again. The process 302 may be called upon to execute periodically so that GSM signals may be detected. For example, the transceiver IC 46 may look for GSM signals every 4.6 milliseconds (ms).

Alternatively, if the block 324 determines that the channel estimate exceeds or otherwise satisfies the threshold, control passes from the block 324 to a block 328. At the block 328, the process 302 informs the GSM receiver 53 of FIG. 2A that a GSM signal is present and enables the GSM receiver 53. Additionally, the block 328 may provide the channel estimate from the adder 270 to the GSM receiver 53. After the block 328 has executed, the process 302 ends.

Figure 6:
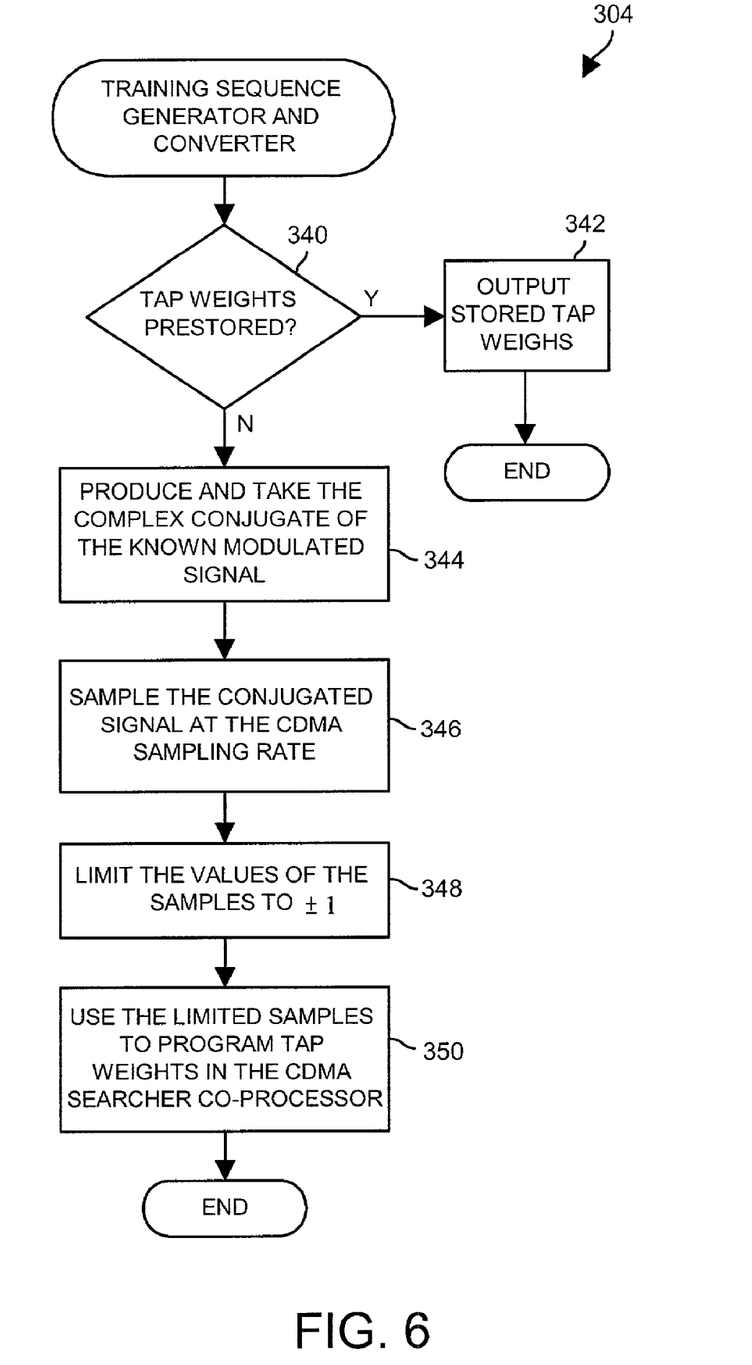
FIG. 6 is an exemplary flow diagram of an embodiment of the training sequence generator and converter function of FIG. 4.

As shown in FIG. 6, the execution of the training sequence generator and converter 304 maybe represented by a flow diagram of a process that begins execution at a block 340. The block 340 determines whether the transceiver IC 46 has previously stored programmable tap weights that the CDMA searcher co-processor 57 uses to produce a channel metric that is indicative of the presence or absence of a GSM signal.

If the block 340 determines that the transceiver IC 46 has previously stored tap weights used for detecting the presence of a GSM signal, control passes from the block 340 to a block 342. The block 342 outputs the stored tap weights to the programmable tap weights $W_0$–$W_{255}$ of the CDMA searcher co-processor 57 of FIG. 3 before ending execution of the process 304.

Alternatively, if the block 340 determines that tap weights for detecting GSM signals have not been prestored, control passes from the block 340 to a block 344, which produces and takes the complex conjugate of a known modulated signal that is substantially identical to the known portion of a GSM signal that has been modulated. After the known modulated signal has been produced and conjugated, control passes from the block 344 to a block 346, which samples the conjugated signal at the CDMA sampling rate. Taken together the blocks 344 and 346 produce samples that may be used as tap weights in the CDMA searcher co-processor 57 of FIG. 3. For example, if at time T, the known modulated signal having a known GSM sequence therein, has a value of 5+j6, the blocks 344 and 346 produce a sample to be used as a tap weight at time T, wherein such a sample has a value of 5–j6. Accordingly, the multiplication of the known modulated signal (5+j6) and the sample (5–j6) would yield a product having a magnitude of 61. Such a product will be produced at one of the multipliers 250–256 of the CDMA searcher co-processor of FIG. 3 and would, therefore, be added to the products produced by other multipliers 250–256 of the CDMA searcher co-processor 57 at the adder 270. Accordingly, as will be readily appreciated, such samples taken at the CDMA sampling rate may be used to detect the presence of a GSM signal.

While the samples produced at the block 346 could be output to the programmable tap weights $W_0$–$W_{255}$ of the CDMA searcher co-processor 57, the process 304 may continue execution after the block 346 and control may pass from the block 346 to a block 348. The block 348 limits the values of the samples to a unity magnitude. For example, if the sample at time T produced by block 346 had a value of 5–j6, the block 348 would convert such a value into 1–j1, wherein each of the real and imaginary components of the sample has a unity value (i.e., a value equal to either +1 or –1). After the block 348 has completed execution, control passes to a block 350, which uses the limited samples produced by the block 348 to program the programmable tap weight $W_0$–$W_{255}$ of the CDMA searcher 57 of FIG. 3.

Accordingly, the process 304 of FIG. 6 sets the programmable tap weights $W_0$–$W_{255}$ of FIG. 3 to values that may be used to detect the presence of a GSM signal. As noted previously, the presence or absence of a GSM signal will be determined by examining the output of the adder 270 of FIG. 3 after the programmable tap weights $W_0$–$W_{255}$ have been set. In general, the process 304 would usually be executed before the process 302 of FIG. 5 so that when the block 324 of FIG. 5 compares the output of the adder 270 of FIG. 3 to the threshold, the output of the adder 270 was produced using programmable tap weights designed for detecting the presence of a GSM signal (i.e., the tap weights produced by the process 304).

Figure 7:
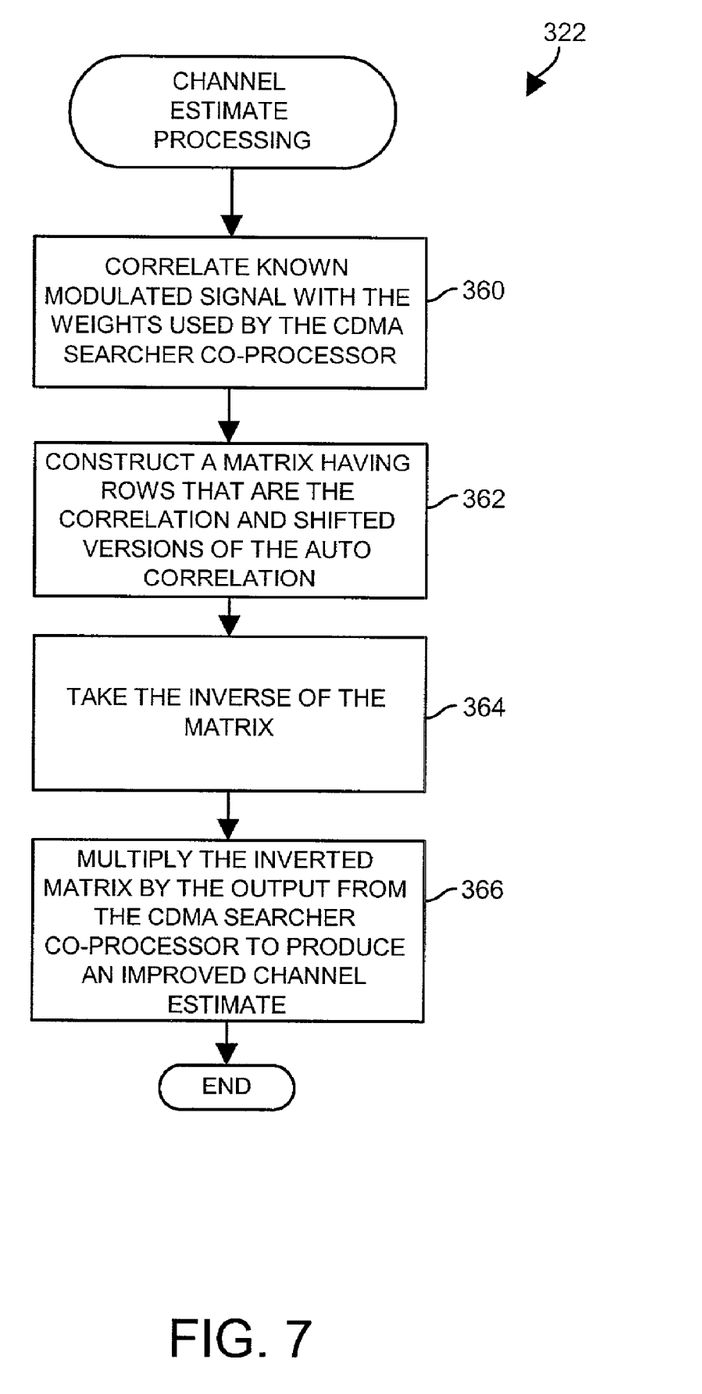
FIG. 7 is an exemplary flow diagram of an embodiment of the channel estimate processing function of FIG. 6.

Turning now to FIG. 7, additional detail regarding the channel estimate processing function 322 is shown. As noted with respect to the block 320 of FIG. 5, the channel estimate processing function 322 is used when the channel estimate produced by the adder 270 of FIG. 3 does not have an acceptable autocorrelation. Accordingly, the channel estimate processing function 322 of FIG. 7 is used to "clean up" channel estimates produced by the adder 270 of FIG. 3 when necessary. The channel estimate processing function 322 begins execution at a block 360, which correlates the known modulated signal with the weights used by the CDMA searcher co-processor 57. As described with respect to the block 344 of FIG. 6, the known modulated signal is a modulated signal having a portion of the known GSM sequence modulated thereon. After the block 360 has executed, control passes to a block 362, which constructs a matrix having rows that are the correlation and shifted versions of the correlation produced by the block 360.

For example, if the sequence (1, 2, 3, 4), which represents samples of the known modulated signal, is correlated with the subset (1, 1), which represents the tap weights, the result of the correlation is (7, 5, 3). To produce a more accurate channel estimate, the correlation is formed into a matrix at block 362. At the block 362, a matrix is formed that has columns that are the correlation and shifted versions of the correlation. At a block 364, the matrix constructed at the block 362 is inverted, thereby resulting in the exemplary matrix shown below in equation 1.

$$\begin{bmatrix} 5 & 7 & 0 \\ 3 & 5 & 7 \\ 0 & 3 & 5 \end{bmatrix}^{-1} \quad \text{Equation 1}$$

A block 366 then multiplies the inverted matrix (shown, for example in Equation 1) by the output of the adder 270 of the CDMA searcher co-processor 57 of FIG. 3 to produce an improved channel estimate. Because a matrix multiplied by its inverse yields the identity matrix and because the inverted matrix constructed by inverting the correlation and shifted versions of the correlation yields the identity matrix when it is multiplied by an ideal channel estimate, multiplying a non-ideal channel estimate by the inverted matrix minimizes the results of off peak correlation products.

Numerous modifications and alternative embodiments of the invention will be apparent to those skilled in the art in view of the foregoing description. Accordingly, this description is to be construed as illustrative only and not as limiting to the scope of the invention. The details of the structure may be varied substantially without departing from the spirit of the invention, and the exclusive use of all modifications, which are within the scope of the appended claims, is reserved.

The invention claimed is:

1. A method of using a code division multiple access (CDMA) receiver having a digital filter to detect the presence of a differently formatted communication signal, the differently formatted signal having a symbol rate and including a known sequence, the method comprising:

programming the digital filter of the CDMA receiver with tap weights that correlate with the known sequence of the differently formatted signal;

determining the known sequence that would be present in the differently formatted signal;

producing a signal representative of the known sequence;

taking the complex conjugate of the signal representative of the known sequence;

sampling the conjugated signal representative of the known sequence at a CDMA chip rate to determine the value of the tap weights;

determining a correlation between received signals and the tap weights of the digital filter; and indicating the presence of the differently formatted signal if the correlation satisfies a threshold.

2. The method of claim 1, wherein the differently formatted signal comprises a global system for mobile communications (GSM) signal.

3. The method of claim 2, wherein the GSM signal is modulated using a constant envelope modulation scheme.

4. The method of claim 1, comprising recalling the tap weights from memory.

5. The method of claim 1, wherein the determining the values of the tap widths comprises limiting the samples of the conjugated known sequence to unit magnitudes.

6. The method of claim 1, wherein the tap weights optimally correlate with the known sequence of an ideal global system for mobile communication (GSM) signal.

7. A method of using a code division multiple access (CDMA) receiver having a digital filter to detect the presence of a differently formatted communication signal, the differently formatted signal having a symbol rate and including a known sequence, the method comprising:

programming the digital filter of the CDMA receiver with tap weights that correlate with the known sequence of the differently formatted signal;

determining a correlation between received signals and the tap weights of the digital filter;

determining if the correlation has an acceptable autocorrelation; and indicating the presence of the differently formatted signal if the correlation satisfies a threshold.

8. The method of claim 7, comprising compensating the correlation if the autocorrelation of the correlation is not acceptable.

9. A method of using a code division multiple access (CDMA) receiver having a digital filter to detect the presence of a differently formatted communication signal, the differently formatted signal having a symbol rate and including a known sequence, the method comprising:

programming the digital filter of the CDMA receiver with tap weights that correlate with the known sequence of the differently formatted signal;

determining a correlation between received signals and the tap weights of the digital filter, wherein the correlation is performed over a subportion of the known sequence; and indicating the presence of the differently formatted signal if the correlation satisfies a threshold.

10. The method of claim 1, comprising enabling a receiver to receive the differently formatted signals if the correlation satisfies the threshold.

11. The method of claim 1, wherein the correlation is performed at a CDMA chip rate.

12. A method of using a code division multiple access (CDMA) receiver having a digital filter to detect the presence of a differently formatted communication signal, the differently formatted signal having a symbol rate and including a known sequence, the method comprising:

programming the digital filter of the CDMA receiver with tap weights that correlate with the known sequence of the differently formatted signal;

determining a correlation between received signals and the tap weights of the digital filter;

determining the timing of a peak correlation between the received, signal and the tap weights of the digital filter; and indicating the presence of the differently formatted signal if the correlation satisfies a threshold.

13. A code division multiple access (CDMA) receiver that detects the presence of a differently formatted signal within received signals, the differently formatted signal having a symbol rate and including a known sequence, the CDMA receiver comprising:
- a digital filter having a plurality of taps each having a programmable tap weight, the digital filter adapted to correlate the received signal with the programmable tap weights;
- a controller that programs the digital filter with tap weights that correlate with the known sequence of the differently formatted signal and that indicates the presence of the differently formatted signal if the correlation performed by the digital filter satisfies a threshold, wherein the controller determines the values of the tap weights by determining the known sequence that would be present in the differently modulated signal representative of the known sequence, taking the complex conjugate of the signal representative of the known sequence and sampling the conjugated signal representative of the known sequence at the CDMA chip rate.

14. The CDMA receiver of claim 13, wherein the differently formatted signal comprises a global system for mobile communications (GSM) signal.

15. The CDMA receiver of claim 14, wherein the GSM signal is modulated using a constant envelope modulation scheme.

16. The CDMA receiver of claim 13, comprising a memory storing the tap weights.

17. The CDMA receiver of claim 13, wherein the controller determines the values of the tap weights by limiting the samples of the conjugated known sequence to unit magnitudes.

18. The CDMA receiver of claim 13, wherein the tap weights optimally correlate with the known sequence of an ideal global system for mobile communications (GSM) signal.

19. The CDMA receiver of claim 13, wherein the controller determines if the correlation has an acceptable autocorrelation.

20. The CDMA receiver of claim 19, wherein the controller compensates the correlation if the autocorrelation of the correlation is not acceptable.

21. The CDMA receiver of claim 13, wherein the correlation is performed over a subportion of the known sequence.

22. The CDMA receiver of claim 13, wherein the controller enables a receiver to receive the differently formatted signals if the correlation satisfies the threshold.

23. A code division multiple access (CDMA) receiver that detects the presence of a differently formatted signal within received signals, the differently formatted signal having a symbol rate and including a known sequence, the CDMA receiver comprising:
- a memory;
- a processor;
- a digital filter;
- a first set of instructions stored on the memory and adapted to cause the processor to program the digital filter of the CDMA receiver with tap weights that correlate with the known sequence of the differently formatted signal;
- a second set of instructions stored on the memory and adapted to cause the processor to determine a correlation between received signals and the tap weights of the digital filter;
- a third set of instructions stored on the memory and adapted to cause the processor to indicate the presence of the differently formatted signal if the correlation satisfies a threshold; and
- a fourth set of instruction stored on the memory and adapted to cause the processor to determine the values of the tap weights, wherein determining the values of the tap weights comprises determining the known sequence that would be present in the differently formatted signal, producing a signal representative of the known sequence, taking the complex conjugate of the signal representative of the known sequence and sampling the conjugated signal representative of the known sequence at the CDMA chip rate.

24. The CDMA receive of claim 23, wherein the differently formatted signal comprises a global system for mobile communications (GSM) signal.

25. The CDMA receiver of claim 24, wherein the GSM signal is modulated using a constant envelope modulation scheme.

26. The CDMA receiver of claim 23, wherein determining the values of the tap weights comprises limiting the samples of the conjugated known sequence to unit magnitudes.

27. A code division multiple access (CDMA) receiver that detects the presence of a differently formatted signal within received signals, the differently formatted signal having a symbol rate and including a known sequence, the CDMA receiver comprising:
- a memory;
- a first set of instructions stored on the memory and adapted to cause the processor to program the digital filter of the CDMA receiver with tap weights that correlate witht eh known sequence of the differently formatted signal;
- a second set of instructions stored on the memory and adapted to cause the processor to determine a correlation between received signals and the tap weights of the digital filter;
- a third set of instructions stored on the memory and adapted to cause the processor to indicate the presence of the differently formatted signal if the correlation satisfies a threshold; and
- a fourth set of instructions stored on the memory and adapted to cause the processor to determine if the correlation has an acceptable autocorrelation.

28. The CDMA receiver of claim 27, comprising a fourth set of instructions stored on the memory and adapted to cause the processor to compensate the correlation if the autocorrelation of the correlation is not acceptable.

29. A code division multiple access (CDMA) receiver that detects the presence of a differently formatted signal with received signals, the differently formatted signal having a symbol rate and including a known sequence, the CDMA receiver comprising:
- an analog to digital converter that samples the received signals at a CDMA chip rate;
- a co-processor including a digital filter having a plurality of taps each having a programmable tap weight, the co-processor adapted to correlate the sampled received signal with the programmable tap weights; and
- a processor that programs the co-processor with tap weights that correlate with the known sequence of the differently formatted signal, determines the values of the tap weights, receives the correlation from the co-processor and indicates the presence of the differently formatted signal if the correlation performed by the co-processor satisfies a threshold wherein determining the values of the tap weights comprises determining the known sequence that would be present in the differently formatted signal, producing a signal representative of the known sequence, taking the complex conjugate of the signal representative of the known sequence and sampling the conjugated signal representative of the known sequence at the CDMA chip rate.

30. The CDMA receiver of claim 29, wherein the differently formatted signal comprises a global system for mobile communications (GSM) signal.

31. The CDMA receiver of claim 30, wherein the GSM signal is modulated using a constant envelope modulation scheme.

32. The CDMA receiver of claim 29, comprising a memory storing the tap weights.

33. The CDMA receiver of claim 29, wherein the processor determines the values of the tap weights by limiting the samples of the conjugated known sequence to unit magnitudes.

34. The CDMA receiver of claim 29, wherein the tap weights optimally correlate with the known sequence of an ideal global system for mobile communications (GSM) signal.

35. A code division multiple access (CDMA) receiver that detects the presence of a differently formatted signal with received signals, the differently formatted signal having a symbol rate and including a known sequence, the CDMA receiver comprising:
  an analog to digital converter that samples the received signals at a CDMA chip rate;
  a co-processor including a digital filter having a plurality of taps each having a programmable tap weight, the co-processor adapted to correlate the sampled received signal with the programmable tap weights; and
  a processor that programs the co-processor with tap weights that correlate with the known sequence of the differently formatted signal, receives the correlation from the co-processor, determines if the correlation has an acceptable autocorrelation, and indicates the presence of the differently formatted signal if the correlation performed by the co-processor satisfies a threshold.

36. The CDMA receiver of claim 35, wherein the processor compensates the correlation if the autocorrelation of the correlation is not acceptable.

* * * * *